Nov. 26, 1963 H. P. DAWRS 3,111,917
SOIL TILLING AND FUMIGATING APPARATUS
Filed Jan. 19, 1959 3 Sheets-Sheet 1
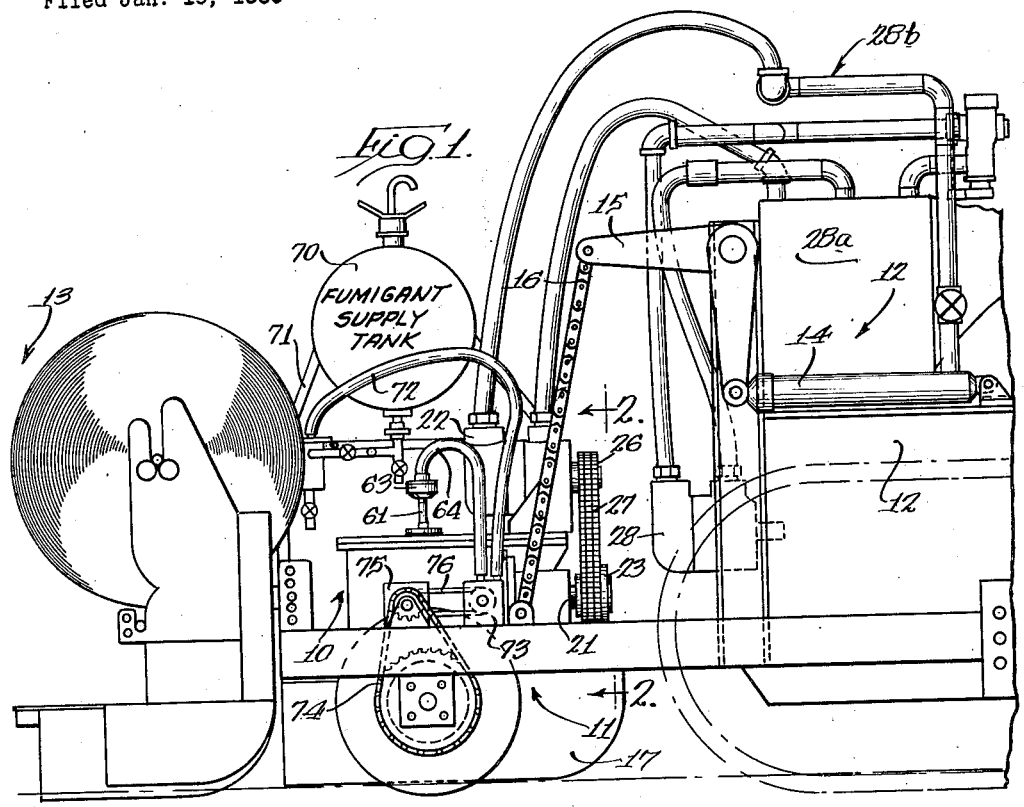
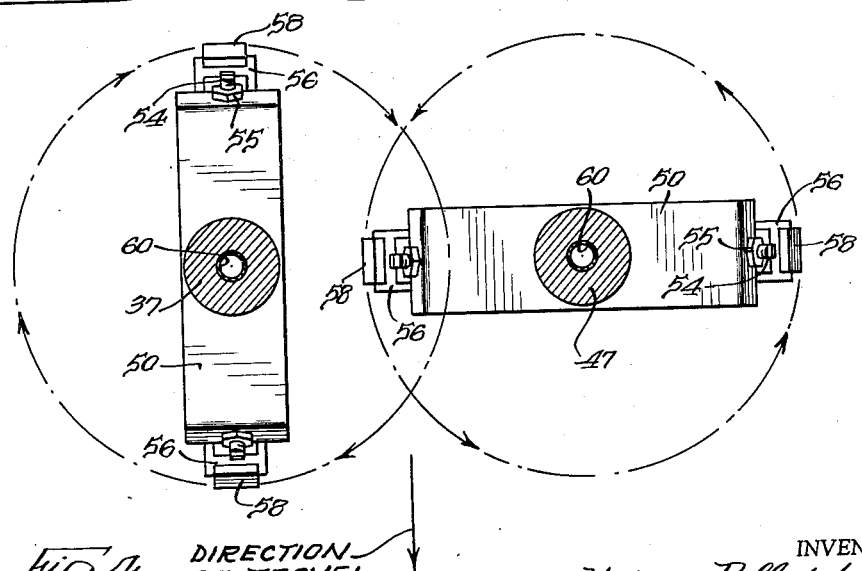
Fig. 4. DIRECTION OF TRAVEL
INVENTOR.
Harvey Pollard Dawrs
BY
Brown, Jackson, Boettcher
& Dienner
Attys.

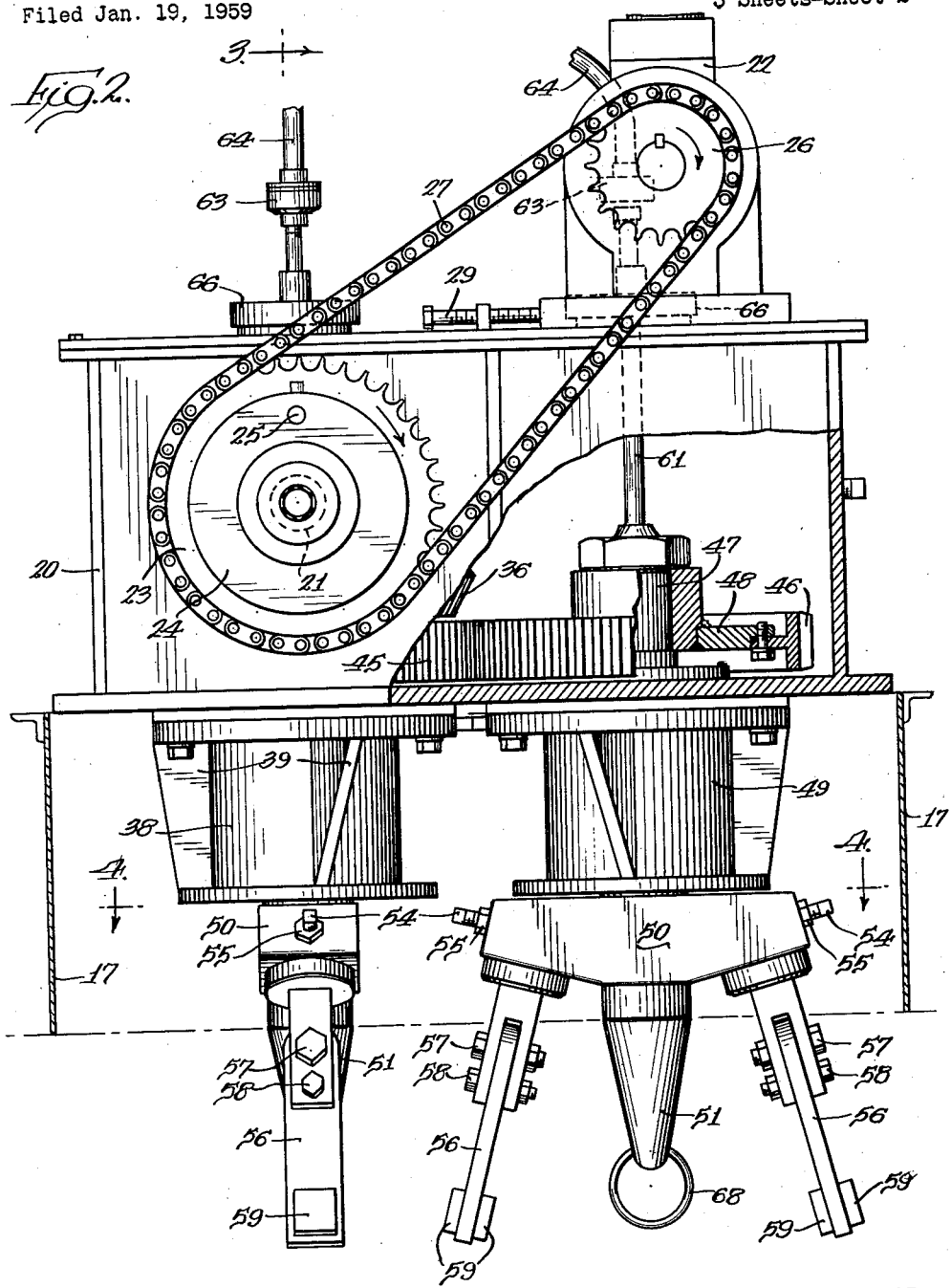

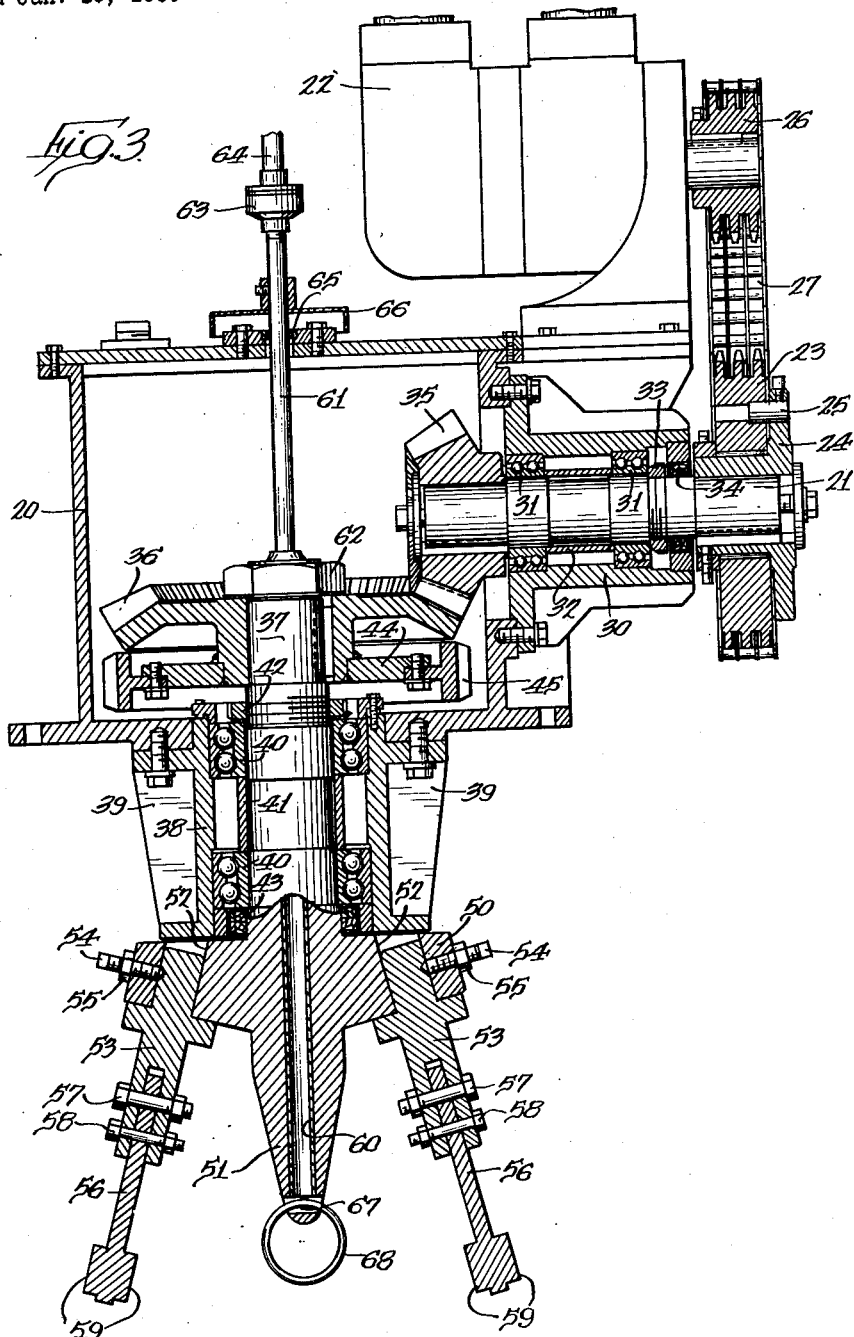

ically on line 4—4 of FIGURE 2, and illustrating the di-

United States Patent Office 3,111,917
Patented Nov. 26, 1963

3,111,917
SOIL TILLING AND FUMIGATING APPARATUS
Harvey Pollard Dawrs, Honolulu, Hawaii, assignor to Libby, McNeill & Libby, Chicago, Ill., a corporation of Maine
Filed Jan. 19, 1959, Ser. No. 787,414
4 Claims. (Cl. 111—6)

The present invention relates to improved soil tilling and fumigating means for preparing seed beds, and to such means as may be applied, for example, to trash mulch machines for preparing seed beds for pineapples.

It is an object of my invention to provide a soil tilling and fumigating apparatus or machine effective for tilling the soil to substantial depth and having means for introducing fumigant into the tilled area at substantial depth. The fumigant is thus distributed substantially uniformly throughout the tilled area at substantial depth therein and incident to tillage thereof. The fumigant introducing means is movable through tilled soil only and is so related to the tillage means as to assure the production of an unfurrowed and smooth seed bed. A further object is to provide apparatus in which the fumigant introducing member is disposed within the tillage area, with the advantages stated, plus the further advantage of precluding substantial soil resistance to travel of such member. The latter has a radial fumigant discharge opening adjacent its lower end and means for preventing soil clogging of such opening. The fumigant introducing member is rotatable with the tillage means and the radial discharge of the fumigant assures substantially uniform distribution thereof centrally of the tilled area. That, in conjunction with the anti-clogging means, which functions also as preliminary mixing means, results in uniform mixing of the fumigant at the central portion of the tilled area and substantially uniform distribution of the fumigant throughout the tilled area and at a substantial depth therein, by the tillage means. Further objects and advantages of my invention will appear from the detailed description.

Now, in order to acquaint those skilled in the art with the manner of making and using the improved soil tilling and fumigating means of my invention, I shall describe, in connection with the accompanying drawings, a preferred embodiment of such means and the preferred manner of making and using the same.

In the drawings:

FIGURE 1 is a fragmentary side elevation of a trash mulch machine equipped with the improvements afforded according to the present invention;

FIGURE 2 is a front view, partly in elevation and partly in section, of a preferred embodiment of the improved soil tilling and fumigating means of the invention;

FIGURE 3 is a vertical sectional view of said means, taken substantially on line 3—3 of FIGURE 2; and FIGURE 4 is a horizontal cross-section taken substantially on line 4—4 of FIGURE 2, and illustrating the directions of rotation and the intermeshing cooperation of the tillers.

Referring now to the drawings, and particularly to FIGURE 1, there is illustrated, fragmentarily, a trash mulch machine equipped with the improved means of the invention. This means is indicated generally at 10 and, as is conventional, is suitably mounted on a wheeled carriage or trailer 11 that is pivotally mounted on and drawn by a tractor 12. As is also conventional, the customary paper laying apparatus 13 is carried by the trailer rearwardly of the apparatus 10, and the entire assembly, including the trailer, is adapted to be raised off the ground by means of hydraulically operated apparatus mounted on the tractor. This latter apparatus suitably includes a piston and cylinder assembly 14, and a bell crank 15, both mounted on the tractor, and a chain 16 extending between the bell crank and the trailer. As thus mounted and drawn, the apparatus or means 10 of the invention is adapted to work on the soil over which the tractor has passed, especially the strip of soil lying between the tracks made by the tractor. For purposes of confining the soil to the described strip during tilling, skirt boards 17 are preferably provided on the trailer to the inboard sides of the wheels thereof.

The apparatus 10 includes a gear case or box 20 that is generally rectangular in plan and mounted on the trailer 11 with its long axis transverse to and its short axis aligned with the longitudinal axis of the trailer. The box 20 mounts a horizontal input shaft 21 that extends forwardly from the box from one side of said short axis thereof. The shaft is adapted to be driven by a hydraulic motor 22 that is mounted on top of the box 20 to the side of its center opposite the shaft 21. Outwardly of the box, the shaft 21 is provided with a multiple toothed sprocket 23 that is keyed to the shaft by means of a mounting sleeve and flange 24 secured to the shaft and a shear pin 25 connecting the sprocket and flange. The shaft of the motor 22 is equipped with a complementary sprocket 26 and driving connection between the sprockets is established by means of roller chains 27. The motor 22 is activated by means of hydraulic fluid supplied thereto by a pump 28 from a reservoir 28a through a suitable piping and valve arrangement 28b all mounted on the tractor, the pump 28 being driven by the tractor in a conventional manner. To facilitate adjustment and repair of the chains 27, the motor 22 is slidably mounted on the box 20 and an adjusting screw 29, having threaded engagement with a nut secured to the box, is provided for varying the position of the motor. The hydraulic motor is a compact unit, and in particular, is mounted on the box forwardly of the transverse center line thereof for a purpose to be described.

The input shaft 21 is supported in a flanged mounting sleeve 30, the flange of which is bolted or otherwise secured to the front wall of the box 20. The shaft is journalled in this sleeve by means of a pair of ball bearing assemblies 31 which are spaced axially from one another by a sleeve 32 extending between the inner races of the bearings, the said races and sleeve being locked to the shaft by means of a nut 33. The outer end of the sleeve 30 is closed by an oil seal assembly 34 and the inner end thereof opens into the interior of the box. On its inner end, within the box 20, the shaft 21 carries a bevel pinion 35 which meshes with a bevel gear 36 that is keyed or otherwise secured to a first vertical tiller shaft 37, the axis of which intersects and is perpendicular to the axis of the input shaft.

The tiller shaft 37 projects downwardly through the lower wall of the box 20 and is supported thereon by means of a mounting sleeve 38. The sleeve 38 includes a short extension fitting snugly in a hole in the bottom wall of the gear case, an upper flange bolted to said wall, a lower flange, and a plurality of reenforcing ribs 39 extending between said flanges, at least some of said ribs being inclined downwardly toward the adjacent side of the box for causing trash engaged thereby to be discharged laterally from the seed bed area. Within the sleeve 38, the shaft 37 is rotatably supported by means of a pair of bearing assemblies 40, the inner races of which are spaced apart by a sleeve 41 and secured to the shaft by a lock nut 42. At its lower end, the sleeve 38 is closed by an oil seal assembly 43, and at its upper end communicates with the interior of the box 20.

Immediately above the lower wall of the box, the hub of the bevel gear 36 is provided with a radial flange 44 to which a ring gear 45 is detachably secured. This gear meshes with an identical ring gear 46 that is carried by a second vertical tiller shaft 47. The shaft 47 is disposed in spaced parallel, coextensive relation with the shaft 37, and the axes of the two shafts are disposed in a common vertical plane that is substantially coincident with the transverse center line of the box 20 and perpendicular to the input shaft 21. The shaft 47 is identical to the shaft 37, and due to the geared connection of the two, is adapted to be rotated at the same speed as but in the direction opposite that of the shaft 37. The ring gear 46 is detachably mounted on a flange 48 having a hub keyed to the shaft 47, this hub and flange corresponding in size and position to the hub of the gear 36 and its flange 44, whereby identical shafts 37 and 47 and identical gears 45 and 46 may be employed with facility. Also by virtue of the described construction, the shaft 47 may be journalled in a supporting sleeve assembly 49 that is identical to the sleeve 38 and the elements contained therein.

To the lower sides of their supporting sleeves 38 and 49, the tiller shafts 37 and 47 are each provided with a transverse head 50 that is preferably formed as a relatively narrow cross bar. Depending axially downward from each cross bar is an integral extension 51 that is generally conical in form. To opposite sides of the extension, the lower surfaces of the head 50 are inclined upwardly and outwardly and the head is provided adjacent its opposite ends with a pair of sockets 52 which are preferably perpendicular, respectively, to the inclined surfaces of the head, so that the axes of the socket are inclined downwardly and outwardly in divergent relation to one another and the extension 51. Removably secured in each socket, axially thereof, is a tine holder 53. Each holder has a radial flange abutting the lower surface of the head and a stem inserted in the respective socket and retained therein by a set screw 54 extending radially inward from the adjacent end of the head 50. To prevent loosening of the set screws, each screw is provided with a lock nut 55. At the lower end portion thereof, each tine holder 53 is bifurcated for detachable reception of a readily replaceable tine 56. The tines 56 are each preferably of bar form and retained between the bifurcations of the respective holder by means of a bolt 57 and a shear pin 58 both of which pass through aligned holes in the tine and the bifurcations of its holder. The tines extend downwardly below the extension 51 and adjacent their lower ends are preferably provided with oppositely extending protuberances 59 for enhancing their soil tilling function.

The radius of the head 50 of each tiller is preferably somewhat greater than one-half the distance between the axes of the shafts 37 and 47 whereby, upon rotation of the shafts, the two heads, and likewise the downwardly divergent tines carried thereby, describe intersecting circular paths of movement. To accommodate intersection of the paths of movement thereof, the heads 50 are offset from one another in circumferential relation by a spacing preferably of 90 degrees, the two heads being retained in such relation by the meshed gears 45 and 46. Consequently, the tines of the tillers intermesh, and will act conjointly to till soil, in the space between the axes of the tiller shafts. If it is desired to employ a larger number of tines than two per tiller, the heads 50 may suitably be circular, of a radius slightly less than one-half the spacing between the axes of the tiller shafts, and carry a plurality of circumferentially spaced tines, the tines of the two sets being circumferentially offset by a suitable arcuate distance to permit intermeshing of the tines in the space between said axes for the purpose stated. In any event, the invention provides two circular arrays of tines rotatable about spaced vertical axes and intermeshing in the space between said axes.

By virtue of the described construction of the tilling apparatus 10, and the defined mounting of the gear case 20 on the trailer 11, the two tillers are mounted for rotation about spaced vertical axes that lie in a common plane extending transversely, preferably at right angles, to the longitudinal axis and the direction of advance of the tractor 12. The tillers are adapted to be entered into the ground to a variable depth depending upon suitable adjustment of the distance between the gear case 20 and the axle of the trailer 11. Preferably, for tilling soil in preparation of a seed bed for pineapples, the tines are entered into the ground to an extent equal substantially to the full length of the tine elements 56 (which length preferably is about 11 inches) as indicated by the dot-dash line in FIGURE 2. In this position, the tines are adapted to work the soil in the area between the tracks left by the tractor when the tractor is advanced over the field and the motor 22 is activated. In the event a tine strikes a foreign object, such as a rock formation, its shear pin 58 and/or the shear pin 25 will break, thereby to prevent damage to the tiller and input shafts and the gears of the drive train. Also, in the event the tines should be bent or broken, or become worn from use, or should the tine holders become defective, the same are readily replaced so that the apparatus may quickly be returned to optimum operating condition.

According to the present invention, the essential character of my improved tilling means resides in the provision of two tillers rotated in opposite directions about spaced vertical axes and having tines which intermesh in the space between said axes. In the specific embodiment of the invention illustrated and described herein, this general form of tilling means has been especially adapted to cope with the particular conditions encountered in the preparation of seed beds for pineapple in Hawaii. In this environment, I have found that best results are achieved by rotating the tillers in the directions indicated in FIGURE 4, i.e., with the tines rotating in the outboard direction when they are adjacent the front of the apparatus, since the tines then cause rocks, stones and other extraneous matter encountered thereby to be moved toward and deposited along the side edges of the strip of soil being tilled. The degree of fineness of tilth obtained in this strip of soil is controlled by the speed of the tines relative to ground and the bite taken into the untilled soil by each tine, which two control factors are dependent upon the mechanical considerations of the speed of advance movement of the tilling means, the speed of rotation of the tillers and the number of tines per tiller.

Relative to the first of these mechanical considerations, it is generally desirable to advance the tilling means or machine forwardly over the field as fast as possible, so that the speed of forward movement usually becomes a constant for any given set of conditions. In the particular environment under discussion, due to power requirements and the type of tractor generally employed, the maximum speed of advance that I have been able to attain is about 150 feet per minute.

The second mechanical consideration, the speed of tiller rotation, is a prime variable in controlling the degree of tilth. The speed of rotation must of course be correlated to the diameter of the tillers and the speed of advance movement of the tilling means, since the ultimate factor over which control is to be exerted is the peripheral speed of each tine relative to ground. In this respect, I have discovered that optimum tilth is obtained with a minimum ratio of about 10 to 1 between the tine speed relative to ground and the speed of advance movement of the tilling means; thus requiring in the present instance a minimum tine speed of 1500 feet per minute. In the particular tilling problem at hand, the seed bed must be at least 32 inches wide, which has led me to adopt a tiller construction wherein the radius of each tiller is about 8.67 inches and the two tillers overlap or intermesh a distance of about 2.67 inches. In this size, each tiller is rotated at 300 r.p.m. thereby to afford a primary tine speed of about 1650 feet per minute, and a resultant tine speed relative to ground of about 1500 feet per minute at the slow or outboard side, and of about 1800 feet per minute at the fast or inboard side, of the tiller.

The third mechanical consideration in the degree of fineness of tilth, i.e., the number of tines per tiller, correlates the speed of rotation and the speed of advance of the tiller to the ultimate control factor of the bite taken by each tine into untilled soil. In the environment under discussion, I have found that the bite per tine should not exceed 3 inches. Since the speed of tiller rotation is 300 r.p.m. and the speed of advance is 150 feet per minute or 1800 inches per minute, the number of tines required per tiller is two (i.e. 1800÷300÷3), which is the construction adopted in the embodiment of the invention selected for illustration herein.

With the benefit of the above analysis of the requirements for optimum tilling, a given tilling means is readily adapted for use in a particular environment by simple relative adjustment of the speed of advance movement of the tillers and the speed and direction of rotation of the tillers; and the construction of a machine ideally suited to local conditions is readily settled upon.

Having thus provided an effective and practical tilling means of the horizontal revolving type, I prefer to incorporate directly therein the improved fumigating means of my invention. This means consists essentially of a fumigant supply duct extending axially downward through each tiller and having outlets located within the interior of the circular path of movement described by the tines of the respective tiller. In its preferred embodiment, the fumigant supply duct comprises a stainless steel tube 60 fitted within and extending through an axial bore in the shaft 37, 47 and the axial extension 51 of the respective tiller. At its upper end, the tube 60 communicates with a second stainless steel tube 61 which is secured and sealed to the upper end of the respective tiller shaft by means of a nut 62 threaded to the shaft and serving to retain the gear thereon. The tube or pipe 61 extends axially upward through a small hole in the top of the gear case or box 20 and at its upper end carries a swivel connector 63 facilitating attachment thereto of a supply hose or pipe 64. To seal the gear case, an oil seal 65 is mounted about the tube 61 at its point of egress from the case, and a stainless steel hood 66 is provided above the seal to prevent entry of fumigants to the gear case and contact of the same with the seal in the event of a leaky connection in the fumigant supply system. In the disclosed embodiment of the apparatus, as intended primarily for use in preparation of seed beds for pineapples, the nature of the fumigants employed is such that it is desirable to utilize stainless steel as the material of the fumigant supply duct. However, it is feasible, especially with use of less corrosive fumigants, to utilize other materials for the duct, and/or to have the lower portion of the duct defined simply by the axial bore through the tiller shaft and its extension 51. Due to the employment of a hydraulic motor, and the specific location thereof on the gear case 20 as previously defined, the space above the vertical tiller shaft 47 is unobstructed, thereby to facilitate axial egress from the case of the fumigant supply duct associated with the shaft 47.

At the lower end thereof, each fumigant duct terminates in a cross bore 67 provided adjacent the lower end of the tiller extension 51, which bore defines laterally open fumigant outlets. Mounted loosely within each bore 67 is a stainless steel ring 68 which normally depends downwardly below the extension 51, but nevertheless is spaced upwardly from the lower ends of the tines 56.

By virtue of the circular movement of the tines 56 about the axis of the extension 51, the tines till the soil prior to passage of the extensions 51 and rings 68, so that the extensions and rings move only through loose soil and are not required to plow up hard, caked or lumpy soil. Consequently, the fumigant is discharged into tilled soil, and due to the rotation of the extension 51, is distributed uniformly through the soil via the radial outlets defined by the bore 67. By virtue of the movement of the extension through the tilled soil and rotation thereof about its axis, movement is continuously imparted to the ring 68 during use of the apparatus, whereby the ring performs a continuous cleaning function relative to the bore 67 and prevents clogging thereof. Also, the rotary movement of the extension renders the same automatically self-cleaning and mitigates accumulation on the extension of weeds and/or roots encountered thereby in passage of the extension through the soil.

Subsequent to passage of the extensions 51 through the tilled soil, the tines 56 pass posteriorly of the extensions thereby to obliterate any furrows formed by the extensions and leave a smooth seed bed in the wake of the apparatus. Also, due to the self-cleaning capability of each extension and the circumscribing movement of the tines, any weeds or debris that would otherwise tend to collect on the extension are removed, thus to prevent occurrence of a furrowed bed.

The supply of fumigant to the soil through the described duct system is preferably rendered proportional to the speed of advance of the machine through the field, thereby to facilitate exact application of the desired quantity of fumigant uniformly throughout the seed beds. In the preferred embodiment of the invention, the fumigant is delivered from a conventional supply tank 70 that is mounted on the trailer 11 in upwardly spaced transverse relation to the tilling means by a supporting framework 71. The tank 70 is provided with conventional valve, filter and drain means and includes a discharge conduit 72 establishing communication between the tank and the inlet of a pump 73 that is mounted on the trailer 11 and driven from one wheel thereof. The drive means for the pump suitably includes a chain and sprocket drive connection 74 between the wheel and a variable speed transmission 75, and a belt or chain drive connection 76 between the transmission and the pump, the transmission 75 being adjustable to permit variation from time to time in the amount of fumigant applied per acre to the seed beds. The pump in turn delivers fumigant to the supply hose 64 and thus to the tubes 61 and 60 and the outlets 67.

In the specifically described embodiment of this invention, I have afforded combined soil tilling and fumigating apparatus. However, it is to be understood that both the tilling apparatus and the fumigating means can be used separately of one another with substantial advantage over conventional means of either character. The tilling apparatus produces an optimum degree of tilth with particular facility and leaves in its wake a substantially smooth seed bed in which the soil is uniformly tilled. The fumigating means, due to its rotation and radial discharge ports, causes distribution of fumigant over a broad area, and the provision of the ring 68 renders the means non-clogging. In combination, as provided according to the preferred embodiment of the invention, the two means afford results not achieved by them separately, especially distribution of fumigant over the entire area of the seed bed, self-cleaning of the tilling and fumigant discharge instrumentalities, and the elimination of furrows in the wake of the two means. Accordingly, it is now believed apparent that the present invention satisfies all of the objects set forth hereinbefore in a convenient, economical and practical manner.

While I have shown and described what I regard to be the preferred embodiment of my invention, it is to be appreciated that various changes, rearrangements and modifications may be made therein without departing from the scope of the invention, as defined by the appended claims.

I claim:

1. In soil tilling and fumigating means, a portable frame, a tiller comprising a head mounted on said frame for rotation about a substantially vertical axis, tillage members mounted on said head rotatable therewith and spaced apart radially thereof, said tillage members extending substantially vertically downward from said head and being substantitally straight and uncurved lengthwise and free of elements effective for turning over the tilled soil, and a fumigant introducing member mounted on said head coaxial therewith and provided adjacent its lower end with a fumigant discharge opening, said tillage members being of a length to till the soil to a predetermined and substantial depth and said fumigant introducing member being of a length to discharge fumigant into the tilled soil at a substantial depth within said predetermined depth of tillage, whereby during travel of said frame said fumigant introducing member travels through tilled soil only and is effective in cooperation with said tillage member for introducing fumigant into the tilled soil and distributing the fumigant substantially uniformly throughout the tilled area at a substantial depth therein approximately the same as the depth at which fumigant is discharged from said fumigant introducing member.

2. In soil tilling and fumigating means, a portable frame, a tiller comprising a head mounted on said frame for rotation about a substantially vertical axis, tillage members mounted on said head rotatable therewith and spaced apart radially thereof, said tillage members extending substantially vertically downward from said head and being substantially straight and uncurved lengthwise and free of elements effective for turning over the tilled soil, and a fumigant introducing member mounted on said head coaxial therewith, said fumigant introducing member being closed at its lower end and provided adjacent thereto with a substantially radial discharge opening and being otherwise imperforate, said tillage members being of a length to till the soil to a predetermined and substantial depth and said fumigant introducing member being of a length to discharge fumigant into the tilled soil at a substantial depth within said predetermined depth of tillage, whereby during travel of said frame said fumigant introducing member travels through tilled soil only and is effective in cooperation with said tillage members for introducing fumigant into the tilled soil and distributing the fumigant substantially uniformly throughout the tilled area at a substantial depth therein approximately the same as the depth at which fumigant is discharged from said fumigant introducing member.

3. In soil tilling and fumigating means, a portable frame, a tiller mounted on said frame for rotation about a substantially vertical axis and having an effective tillage area of a predetermined depth, means for introducing fumigant into the tilled soil comprising a member mounted on said frame substantially coaxial with said tiller projecting downward to an extent within said depth of tillage and provided adjacent its lower end with a transverse fumigant discharge opening, whereby said member moves through tilled soil only and the fumigant is introduced into the soil centrally of said tilled area and is distributed substantially uniformly throughout such area by said tiller, during travel of said frame, and a ring extending loosely through said opening effective for preventing clogging thereof by the tilled soil.

4. In soil tilling and fumigating means, a portable frame, a tiller comprising a head mounted on said frame for rotation about a substantially vertical axis and tillage members substantially straight lengthwise mounted on said head extending downward therefrom and having an effective tillage area of a predetermined depth, said tillage members being free of elements effective to cause turning over of the tilled soil means for introducing fumigant into the tilled soil comprising a member carried by said head substantially coaxially and rotatable therewith and projecting downward therefrom to substantial extent within said tillage depth, said member being closed at its lower end and provided adjacent thereto with a substantially radial fumigant discharge opening and being otherwise imperforate, and an agitator member extending loosely through said opening restrained against displacement therefrom and projecting radially outward beyond said fumigant introducing member, said tillage members being spaced radially outward from said fumigant introducing member and effective for tilling the soil without turning over thereof, said fumigant introducing member moving through tilled soil only and being effective for discharging fumigant radially into the tilled soil at substantial depth centrally of the tilled area, said agitator member being effective for precluding soil clogging of said opening and for mixing the discharged fumigant with the soil at the central portion of the tilled area and said tillage members being effective for distributing the fumigant from the central portion of the tilled area substantially uniformly at such depth throughout such area, during travel of said frame.

References Cited in the file of this patent

UNITED STATES PATENTS

| | | |
|---|---|---|
| 75,310 | Standish | Mar. 10, 1868 |
| 661,307 | Darby | Nov. 6, 1900 |
| 1,979,541 | Gunn | Nov. 6, 1934 |
| 1,997,097 | Bartlett | Apr. 9, 1935 |
| 2,509,627 | Bickerton | May 30, 1950 |
| 2,582,364 | Tice | Jan. 15, 1952 |
| 2,601,277 | Green | June 24, 1952 |
| 2,755,718 | Arndt | July 24, 1956 |
| 2,888,084 | Trecker | May 26, 1959 |

FOREIGN PATENTS

| | | |
|---|---|---|
| 124,777 | Australia | June 30, 1947 |
| 555,826 | Italy | Jan. 31, 1957 |